(No Model.)
E. R. CAHOONE.
BRIDLE BIT.
No. 510,890. Patented Dec. 19, 1893.
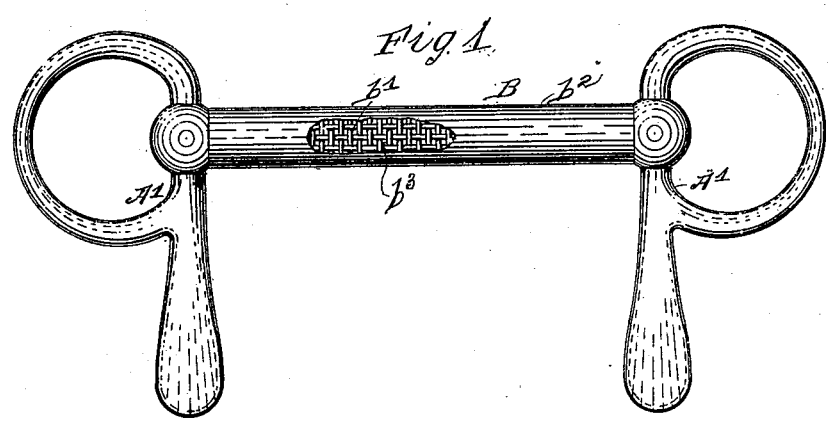
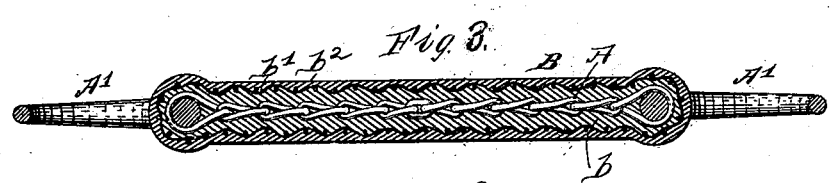
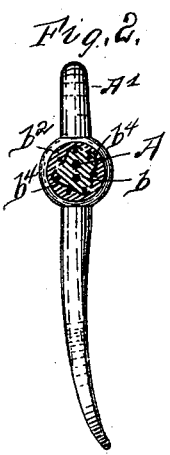
WITNESSES:
INVENTOR
Edwin R. Cahoone
BY Edwin H. Brown
HIS ATTORNEY

UNITED STATES PATENT OFFICE.

EDWIN R. CAHOONE, OF NEWARK, NEW JERSEY.

BRIDLE-BIT.

SPECIFICATION forming part of Letters Patent No. 510,890, dated December 19, 1893.

Application filed January 5, 1893. Serial No. 457,307. (No model.)

*To all whom it may concern:*

Be it known that I, EDWIN R. CAHOONE, of Newark, Essex county, State of New Jersey, have invented a certain new and useful Improvement in Bridle-Bits, of which the following is a specification.

This invention relates to bridle bits of the class where the core of the bit is flexible and where rubber is employed as a covering for such core, the object of my improvement being to insure the rubber covering against cracking in use, as well as to impart the maximum degree of flexibility and efficiency to the bit.

Heretofore, bridle bits have been constructed with chain and other flexible cores, and rubber tubes have been slipped over such cores,—and the cores have also been supplied with coverings of flexible compounds of soft rubber vulcanized directly upon the core,—and sectional rubber coverings have been secured and cemented on the bits,—but none of these arrangements has been free from the liability to crack, and thus their efficiency and durability have been seriously impaired.

My invention consists, briefly speaking, of a bridle bit produced by first applying a coating of soft rubber to the metal core of the bit, firmly pressing the same,—so that when a chain is used the rubber will meet and become joined in the interstices of the links,—and then applying to the exterior of this soft rubber one or more layers or strips of a textile material having a wide mesh, and little or no stretching qualities, and then applying an outer coating of unvulcanized rubber, and pressing the whole firmly together so that the outer layer of rubber will meet and join the inner layer between the interstices of the fabric, and then pressing and vulcanizing the whole into one compact and integral flexible bar.

In the accompanying drawings I have illustrated a bridle bit embodying the improvement above mentioned.

Figure 1 is a top or plan view of a bit, with a portion broken away to show the textile fabric employed. Fig. 2 is a transverse section. Fig. 3 is a longitudinal section.

Referring by letter to the drawings A designates a flexible core, such as a chain or resilient metal piece engaging at its ends with the rings A'.

B indicates the mouth piece proper consisting of the layer of soft rubber $b$, surrounding the core A, the textile fabric $b'$ surrounding the layer $b$ and the layer of soft rubber $b^2$ surrounding the textile fabric $b'$. The flexible covering may extend over and cover the ends of the core, as shown in Fig. 3. The textile fabric $b'$ is of coarse mesh and is inserted before the rubber is vulcanized, so that portions of rubber $b^3$ extend through the mesh and, when vulcanized, these portions $b^3$ connect the layers $b$, $b^2$ of rubber, whereby the fabric has the effect of being woven into a solid body of rubber. This fabric gives strength to the body and prevents stretching of the rubber. The textile fabric need not be in one piece extended around the inner layer of rubber, as, in fact, I have found it quite convenient to employ two or more strips, $b^4$ placed longitudinally of the bit with the edges close together as indicated in Fig. 2.

Having described my invention, what I claim is—

1. A bridle bit consisting, essentially, of a flexible metal core, a layer or coating of soft rubber joined to said core, a layer of fabric having a coarse mesh applied upon said rubber layer, and an outer layer of soft rubber applied upon said fabric, and entirely surrounding the sides and ends of the core the whole being pressed and vulcanized in such manner that the rubber layers are joined to each other through the meshes of the fabric and a homogeneous mass formed, substantially as specified.

2. In a brible bit, the combination with the end rings and a core, formed of links of the mouth piece proper consisting of soft rubber surrounding the core, and joined in the interstices of said linked core a textile fabric of coarse mesh surrounding said layer of rubber, and a layer of soft rubber surrounding the fabric, the said layers of rubber being joined together by portions extending through the mesh of the fabric, substantially as specified.

In testimony whereof I have signed my name to this specification in the presence of two subscribing witnesses.

EDWIN R. CAHOONE.

Witnesses:
 ABRAHAM MANNERS,
 CHAS. C. O'CONNOR.